US009680290B2

(12) United States Patent
Kimoto et al.

(10) Patent No.: US 9,680,290 B2
(45) Date of Patent: Jun. 13, 2017

(54) ELECTRIC CABLE WITH PROTECTION MEMBER

(71) Applicants: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-shi, Osaka (JP)

(72) Inventors: Yuichi Kimoto, Mie (JP); Masashi Fujiki, Mie (JP); Katsutoshi Izawa, Mie (JP); Yasushi Itani, Mie (JP)

(73) Assignees: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/105,101

(22) PCT Filed: Dec. 3, 2014

(86) PCT No.: PCT/JP2014/081984
§ 371 (c)(1),
(2) Date: Jun. 16, 2016

(87) PCT Pub. No.: WO2015/093293
PCT Pub. Date: Jun. 25, 2015

(65) Prior Publication Data
US 2016/0322797 A1 Nov. 3, 2016

(30) Foreign Application Priority Data

Dec. 19, 2013 (JP) ................................. 2013-262092

(51) Int. Cl.
*H02G 3/32* (2006.01)
*H02G 3/04* (2006.01)
(Continued)

(52) U.S. Cl.
CPC ........... *H02G 3/0468* (2013.01); *B60R 16/02* (2013.01); *B60R 16/0215* (2013.01);
(Continued)

(58) Field of Classification Search
CPC combination set(s) only.
See application file for complete search history.

(56) References Cited

U.S. PATENT DOCUMENTS 9,539,959 B2 * 1/2017 Matsumura ............... F16B 2/08
2011/0297415 A1 12/2011 Katou
2013/0118798 A1 * 5/2013 Hiraike .................... H01B 9/02
174/70 R

FOREIGN PATENT DOCUMENTS

| JP | 63202124 U | 12/1998 |
| JP | 2002048957 A | 2/2002 |
| JP | 2005080380 A | 3/2005 |

OTHER PUBLICATIONS

International Search Report and Written Opinion for Application No. PCT/JP2014/081984 dated Mar. 10, 2015, 7 pages.
(Continued)

*Primary Examiner* — Dhirubhai R Patel
(74) *Attorney, Agent, or Firm* — Reising Ethington P.C.

(57) ABSTRACT

An electric cable with protection member that makes it possible to waterproof an electric cable, ensure shock resistance with respect to a portion of the electric cable, and maintain the shape of the electric cable and, furthermore, that is easily adaptable to specification changes and dimensional tolerances and is produced at low cost. An electric cable with protection member includes an electric cable, a tube that is continuous in a circumferential direction, a metal
(Continued)

exterior member surrounding the circumference of a portion of the tube, and a plurality of fixing portions. The metal exterior member is a member that is formed in a tubular shape capable of bending deformation and that can maintain a fixed shape against the load of the electric cable and the tube. The fixing portions are portions that can be fixed to a support.

5 Claims, 4 Drawing Sheets

(51) Int. Cl.
    *B60R 16/02* (2006.01)
    *H01B 7/282* (2006.01)
(52) U.S. Cl.
    CPC ............. *H01B 7/2825* (2013.01); *H02G 3/04* (2013.01); *H02G 3/0406* (2013.01); *H02G 3/32* (2013.01)

(56) References Cited

OTHER PUBLICATIONS

English Translation of International Search Report for Application No. PCT/JP2014/081984 dated Mar. 10, 2015, 2 pages.

\* cited by examiner

ELECTRIC CABLE WITH PROTECTION MEMBER

CROSS REFERENCE TO RELATED APPLICATIONS

This application claims the priority of Japanese patent application JP2013-262092 filed on Dec. 19, 2013, the entire contents of which are incorporated herein.

TECHNICAL FIELD

The present invention relates to an electric cable with protection member including an electric cable and a protection member surrounding the circumference of the electric cable.

BACKGROUND ART

In a vehicle such as an automobile, in the case where an electric cable is attached to a position, such as a position in an engine compartment, for example, outside a passenger room, a synthetic resin tube surrounding the circumference of the electric cable is used to protect and waterproof the electric cable. The synthetic resin tube is an example of a protection member (protective tube) for the electric cable.

For example, a flexible synthetic resin tube such as a corrugated tube may be used as a protection member that also has a waterproofing function. It should be noted that the corrugated tube that also has the waterproofing function is a corrugated tube that is continuous in a circumferential direction.

Moreover, Patent Document 1 (JP 2004-224156A) discloses the use of a metal pipe surrounding the circumference of an electric cable, as a protection member for the electric cable. The metal pipe has greater shock resistance than a synthetic resin tube and also has the waterproofing function and the function of maintaining the electric cable in a shape that conforms to a predetermined route.

Moreover, there are cases where, as a protection member for that portion of an electric cable for use in vehicles that is installed near a hard and heavy object such as an engine, a metal protector having excellent shock resistance and the function of maintaining the shape of the electric cable is used. Generally, a metal protector has a structure in which a plurality of metal members that are formed in predetermined shapes are combined together.

SUMMARY OF INVENTION

In the case where a conventional metal pipe or metal protector is employed, for each specification of the wiring route, it is necessary to accurately form the metal pipe or other hard metal member into a shape that meets the specification, using a large-scale forming apparatus. Therefore, conventional metal pipes and metal protectors cannot be said to be easily adaptable to specification changes and dimensional tolerances, and it is also difficult to reduce the cost of the conventional metal pipes and metal protectors.

It is an object of the present design to provide an electric cable with protection member that makes it possible to waterproof an electric cable, ensure shock resistance with respect to a portion of the electric cable, and maintain the shape of the electric cable and, furthermore, that is easily adaptable to specification changes and dimensional tolerances and is produced at low cost.

An electric cable with protection member according to a first aspect includes an electric cable, a tube, a metal exterior member, and a plurality of fixing portions. The tube surrounds the circumference of at least a portion of a region of the electric cable in a longitudinal direction. Furthermore, the tube is formed in a tubular shape that is continuous in a circumferential direction, and has flexibility. The metal exterior member surrounds the circumference of a portion of a region of the tube in the longitudinal direction. Furthermore, the metal exterior member is a member that is formed in a tubular shape capable of bending deformation and that can maintain a fixed shape against a load of the electric cable and the tube. The plurality of fixing portions are portions that are provided on the metal exterior member and that can be fixed to a support.

An electric cable with protection member according to a second aspect is an embodiment of the electric cable with protection member according to the first aspect. In the electric cable with protection member according to the second aspect, the metal exterior member may be a member formed in a tubular shape having a continuous slit extending over an entire length of the metal exterior member.

An electric cable with protection member according to a sixth aspect is an embodiment of the electric cable with protection member according to the first or second aspect. In the electric cable with protection member according to the sixth aspect, the metal exterior member may be a member containing a magnetic material.

An electric cable with protection member according to a seventh aspect includes an electric cable, a tube surrounding a circumference of at least a portion of a region of the electric cable in a longitudinal direction, the tube being formed in a tubular shape that is continuous in a circumferential direction, and having flexibility, a metal exterior member surrounding the circumference of a portion of a region of the tube in the longitudinal direction, the metal exterior member being formed in a tubular shape that is capable of bending deformation, and being able to maintain a fixed shape against a load of the electric cable and the tube, a plurality of fixing portions that are provided on the metal exterior member and that can be fixed to a support, and an interposed member interposed between the tube and the metal exterior member, wherein each of the tube and the metal exterior member is a member formed in a tubular shape having a bellows structure in which a series of alternate small-diameter and large-diameter portions are formed, the small-diameter portions having an outline size in the circumferential direction that is different from that of the large-diameter portions, and the interposed member is formed in an annular shape in which a protrusion to be fitted between adjacent ones of the large-diameter portions of the tube is formed on an inner surface side, and a protrusion to be fitted between adjacent ones of the small-diameter portions of the metal exterior member is formed on an outer surface side.

In each of the above-described aspects, the tube that is continuous in the circumferential direction has the functions of waterproofing and protecting the electric cable. Meanwhile, the metal exterior member ensures the shock resistance with respect to a portion of the electric cable and also maintains the shape of the electric cable. It should, however, be noted that the metal exterior member that is capable of bending deformation does not have enough stiffness to maintain a fixed shape against a large external force. However, in a state in which the plurality of fixing portions provided at a plurality of locations on the metal exterior member are fixed to the support such as a body panel of a vehicle, the plurality of fixing portions serve to keep the metal exterior member in a fixed shape against a large external force.

Furthermore, the tube on the inner side is a flexible member, and the metal exterior member on the outer side is a member that is capable of bending deformation. Therefore, the metal exterior member can be relatively easily deformed in accordance with specification changes and dimensional tolerances of a wiring route, without using a large-scale forming apparatus. As a result, a metal exterior member having a shape that meets the specifications of the wiring route can be provided at relatively low cost.

For the above-described reasons, according to each of the above-described aspects, it is possible to provide an electric cable with protection member that makes it possible to waterproof an electric cable, ensure shock resistance with respect to a portion of the electric cable, and maintain the shape of the electric cable and, furthermore, that is easily adaptable to specification changes and dimensional tolerances and is produced at low cost.

Moreover, according to the first aspect, even in the case where a member made of a relatively hard synthetic resin having excellent wear resistance is employed as the tube, it is easy to ensure the flexibility of the tube due to the bellows structure. Similarly, even in the case where a metal member having excellent shock resistance is employed as the metal exterior member, it is easy to render the metal exterior member capable of bending deformation due to the bellows structure.

Moreover, according to the second aspect, the metal exterior member has a tubular shape having a continuous slit extending over the entire length of the metal exterior member. Thus, a portion of the tube can be inserted into a hollow portion of the metal exterior member through the slit of the metal exterior member. That is to say, a step of passing the electric cable and the tube through the hollow portion of the metal exterior member from one end thereof is not necessary. As a result, a step of making the metal exterior member cover the circumference of a portion of the tube is easy.

Moreover, according to the first aspect, the interposed member prevents displacement of the metal exterior member relative to the tube and also prevents the portion of the metal exterior member to which the fixing portions are attached from deforming inward due to the pressure applied from the fixing portions.

Moreover, according to the sixth aspect, the metal exterior member containing a magnetic material not only has the functions of protecting the electric cable and maintaining the shape of the electric cable but also functions as a magnetic shielding material. Such metal exterior member is preferable in the case where magnetic shielding of the electric cable is required.

DESCRIPTION OF EMBODIMENTS

Hereinafter, an embodiment of the present invention will be described with reference to the accompanying drawings. The embodiment below is merely a specific example of the present invention and is not to be construed as limiting the technical scope of the invention.

Embodiment

First, an electric cable 10 with protection member according to an embodiment of the present invention will be described with reference to FIG. 1. The electric cable 10 with protection member is a wire harness to be installed in a vehicle such as an automobile. The electric cable 10 with protection member may be attached to a support within an engine compartment of the vehicle, for example.

Figure 1:
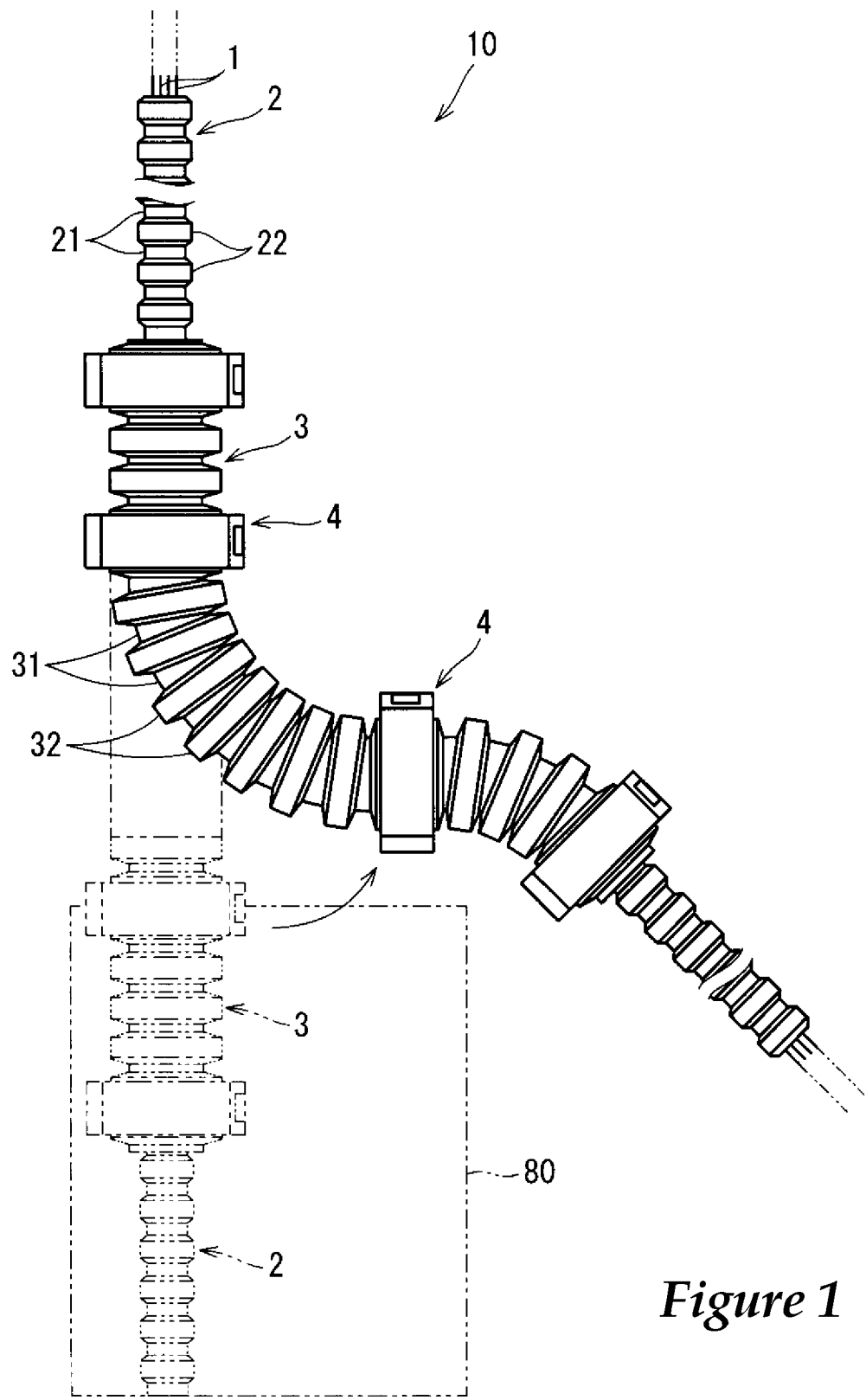
FIG. 1 is a side view of an electric cable 10 with protection member according to an embodiment of the present invention.

As shown in FIG. 1, the electric cable 10 with protection member includes an electric cable 1, a synthetic resin tube 2, a metal exterior member 3, and a plurality of fixing members 4. Furthermore, in the example shown in FIG. 2, the electric cable 10 with protection member also includes an interposed member 7.

The electric cable 1 is, for example, an insulated electric cable having a core wire, which is an elongated conductor, and an insulating coating, which is an insulator surrounding the circumference of the core wire. The core wire of the electric cable 1 is, for example, a wire material made of a metal mainly composed of copper or a wire material made of a metal mainly composed of aluminum. In the examples shown in FIGS. 1 and 2, the electric cable 10 with protection member includes a plurality of electric cables 1 that are bundled together (electric cable bundle).

A terminal, which is not shown, for connecting the electric cable 1 to a connection target is often connected to an end portion of the electric cable 1. It should be noted that a configuration is also conceivable in which the electric cable 1 is a bare electric cable provided with no insulating coating.

The synthetic resin tube 2 is a tubular member surrounding the circumference of at least a portion of the region of the electric cable 1 in a longitudinal direction. For example, the synthetic resin tube 2 surrounds the circumference of a region from the vicinity of one end portion of the electric cable 1 to the vicinity of the other end portion. It should be noted that the synthetic resin tube 2 is an example of a tube covering the circumference of the electric cable 1.

The synthetic resin tube 2 is formed in a tubular shape that is continuous in the circumferential direction. In the present embodiment, the synthetic resin tube 2 is a corrugated tube that is formed in a tubular shape having a bellows structure constituted by a series of alternate small-diameter portions 21 and large-diameter portions 22, the small-diameter portions 21 having an outline size in the circumferential direction that is different from that of the large-diameter portions 22.

Since the synthetic resin tube 2 has the bellows structure, the synthetic resin tube 2 is flexible. The synthetic resin tube 2 is an example of a protective tube having pliability and thus being flexibly deformable. The synthetic resin tube 2 is, for example, a tube made of a synthetic resin mainly composed of polypropylene, polyamide, polyethylene, or the like.

The metal exterior member 3 is a tubular metal member surrounding the circumference of a portion of the region of the synthetic resin tube 2 in the longitudinal direction. This metal exterior member 3 is a tubular member that is formed in a tubular shape capable of bending deformation and that has a degree of hardness that allows the metal exterior member 3 to keep a fixed shape against the load of the electric cable 1 and the synthetic resin tube 2. That is to say, the bending deformation of the metal exterior member 3 is primarily plastic deformation.

It is conceivable that the metal exterior member 3 is a member made of a metal containing aluminum, stainless steel, or the like, for example.

Moreover, it is also conceivable that the metal exterior member 3 is a member made of a metal containing a magnetic material such as iron, silicon steel, permalloy, ferrite, or the like.

In the present embodiment, the metal exterior member 3 is a metal member that is formed in a tubular shape having a bellows structure in which a series of alternate small-diameter portions 31 and large-diameter portions 32 are formed in the longitudinal direction, the small-diameter portions 31 having an outline size in the circumferential direction that is different from that of the large-diameter portions 32.

Figure 4:
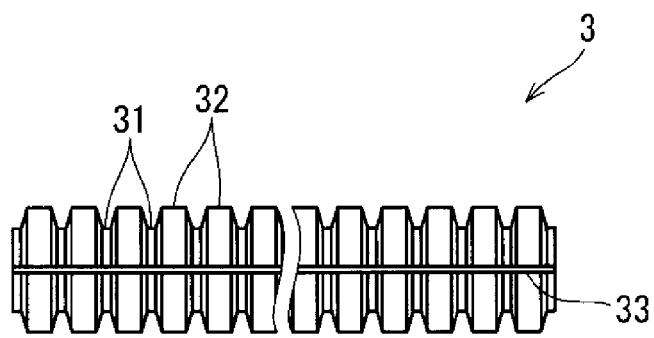
FIG. 4 is a side view of a metal exterior member included in the electric cable 10 with protection member.

As shown in FIG. 4, the metal exterior member 3 according to the present embodiment is formed in a tubular shape having a continuous slit 33 extending over the entire length of the metal exterior member 3. Thus, the synthetic resin tube 2 can be inserted into a hollow portion of the metal exterior member 3 through the slit 33.

The interposed member 7 is an annular member interposed between the synthetic resin tube 2 and the metal exterior member 3. The interposed member 7 is a member made of a synthetic resin such as polypropylene, polyethylene, polyvinyl chloride, polyethylene terephthalate, polyamide, or the like, for example.

Figure 3:
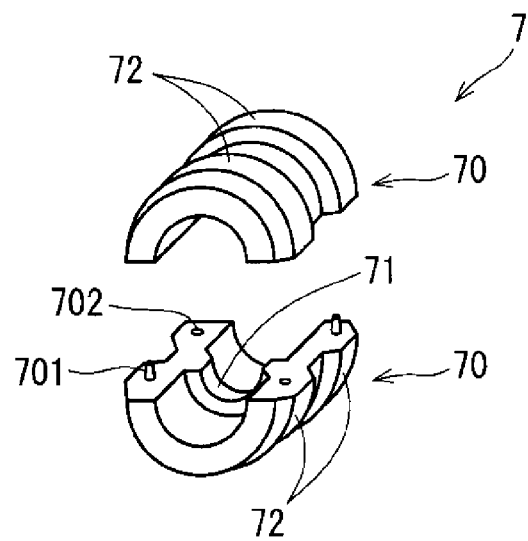
FIG. 3 is an exploded perspective view of an interposed member included in the electric cable 10 with protection member.

As shown in FIG. 3, the annular shape of the interposed member 7 is formed by combining a plurality of elemental members 70 that have been formed in advance. In the example shown in FIG. 3, the interposed member 7 is a member into which two semi-annular elemental members 70 are combined. The two elemental members 70 are maintained in the combined state by a temporary fastening protrusion 701 formed on one of the elemental members 70 and a temporary fastening recess 702 formed in the other elemental member 70 fitting to each other.

It should be noted that in the example shown in FIG. 3, the two elemental members 70 are semi-annular members having the same shape. However, a configuration is also conceivable in which the two elemental members 70 are formed in different shapes.

Figure 2:
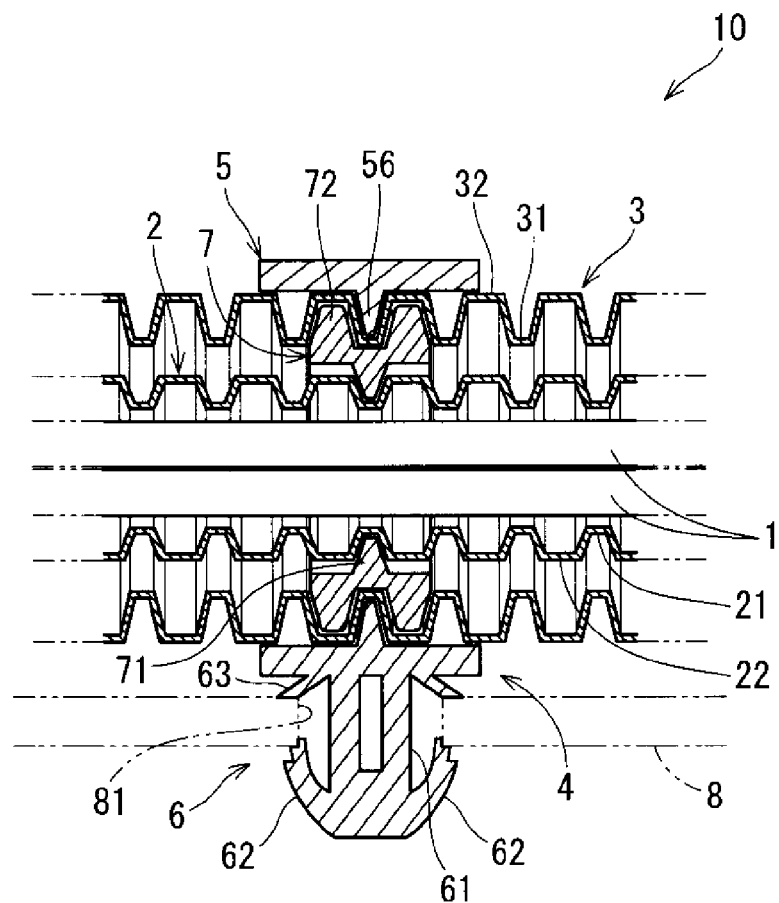
FIG. 2 is a cross-sectional view of a portion of the electric cable 10 with protection member.

As shown in FIGS. 2 and 3, the interposed member 7 is a member in which an inner protrusion 71 to be fitted between adjacent large-diameter portions 22 of the synthetic resin tube 2 is formed on an inner surface side and outer protrusions 72 to be fitted between adjacent small-diameter portions 31 of the metal exterior member 3 are formed on an outer surface side.

The interposed member 7 maintains the positional relationship between the synthetic resin tube 2 and the metal exterior member 3 by the inner protrusion 71 engaging with the synthetic resin tube 2 and the outer protrusions 72 with the metal exterior member 3.

In the example shown in FIG. 3, the inner protrusion 71 and the outer protrusions 72 are each an annular protrusion that is continuously formed in the circumferential direction of the annular interposed member 7. However, a configuration is also conceivable in which one or both of the inner protrusion 71 and the outer protrusions 72 are protrusions that are formed within a portion of the region of the annular interposed member 7 in the circumferential direction.

In FIG. 1, the electric cable 10 with protection member in a state in which the synthetic resin tube 2 and the metal exterior member 3 are not bent as well as an object to be avoided 80 are shown by phantom lines (long dashed double-short dashed lines). The object to be avoided 80 is, for example, a vehicle component or the like, with which interference should be avoided when the electric cable 10 with protection member is attached to the vehicle or the like.

The metal exterior member 3 surrounds a portion of the electric cable 1 from outside the synthetic resin tube 2, thereby ensuring the shock resistance of the electric cable 1 and maintaining the shape of the electric cable 1. FIG. 1 shows a state in which the metal exterior member 3 maintains a shape that is bent along a predetermined route for avoiding interference with the object to be avoided 80.

The metal exterior member 3 is a member that is formed to have a degree of hardness that allows the metal exterior member 3 to maintain a fixed shape unless an external force other than the load applied from the electric cable 1 and the synthetic resin tube 2 passing through the hollow portion of the metal exterior member 3 is applied to the metal exterior member 3.

Each fixing member 4 is a member that is attached to the metal exterior member 3 and that can be fixed to a support such as a body panel of the vehicle. A plurality of fixing members 4 are attached to a plurality of locations on the metal exterior member 3. It should be noted that the fixing members 4 are an example of a fixing portion provided on the metal exterior member 3.

Figure 5:
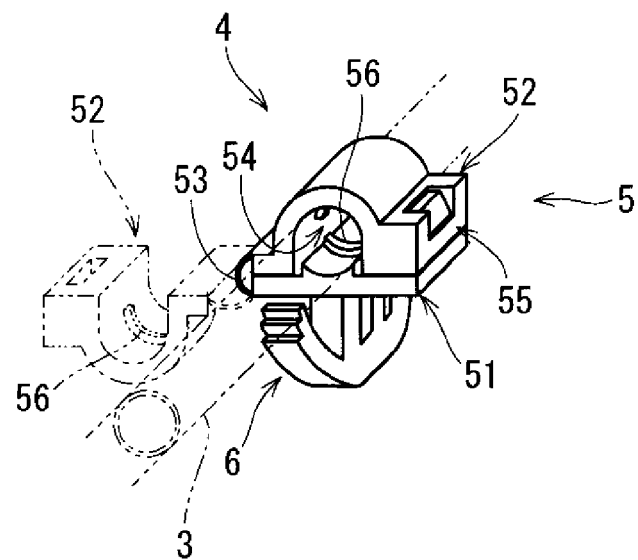
FIG. 5 is a perspective view of a fixing member included in the electric cable 10 with protection member.

As shown in FIG. 5, each fixing member 4 has a connection portion 5 connected to a portion of the metal exterior member 3 and a fastener portion 6 that can be fastened to an attachment hole 81 portion of the support 8.

With respect to the connection portion 5 of the fixing member 4, it should be noted that in FIG. 5, the support 8 to which the fastener portion 6 of the fixing member 4 is fastened is shown by phantom lines (long dashed double-short dashed lines).

The fixing members 4 are formed members made of a synthetic resin such as polyamide, polypropylene, polybutylene terephthalate, ABS resin, or the like, for example. It should be noted that a configuration is also conceivable in which the fixing members 4 are members made of a metal.

In the example shown in FIG. 5, the connection portion 5 of each fixing member 4 has a first side portion 51 and a second side portion 52 that hold a portion of the metal exterior member 3 therebetween and a hinge portion 53 that couples the first and second side portions 51 and 52 in a relatively rotatable manner.

A portion of the first side portion 51 and a portion of the second side portion 52 engage with each other and thus constitute a lock portion 55 that maintains the first side portion 51 and the second side portion 52 in a combined state. The first side portion 51 and the second side portion 52 are combined together in a state in which a portion of the metal exterior member 3 is held therebetween.

The first side portion 51 and the second side portion 52 are connected to the metal exterior member 3 by holding the portion of the metal exterior member 3 therebetween. Thus, when combined with each other, the first side portion 51 and the second side portion 52 form an exterior member insertion hole 54 through which the metal exterior member 3 passes.

Moreover, the connection portion 5 of each fixing member 4 keeps the metal exterior member 3 in a state in which the slit 33 of the metal exterior member 3 is closed, by the first side portion 51 and the second side portion 52 of the connection portion 5 holding the metal exterior member 3 from both sides. Thus, the time and efforts required for winding an adhesive tape around the metal exterior member 3, or performing welding so as to close the slit 33, in order to prevent the synthetic resin tube 2 from protruding from the slit 33 of the metal exterior member 3 can be saved.

Furthermore, an inner protrusion 56 to be fitted between adjacent large-diameter portions 32 of the metal exterior member 3 is formed on an inner surface of the exterior member insertion hole 54, of the first side portion 51 and the second side portion 52. Thus, displacement of the fixing member 4 relative to the metal exterior member 3 is prevented.

On the other hand, the fastener portion 6 is an example of a portion that can be fixed to the support 8. The fastener portion 6 has an upright portion 61 extending upright from the connection portion 5 and projecting portions 62 that are formed projecting to opposite sides from a portion near a leading end of the upright portion 61. Furthermore, the fastener portion 6 has a flange portion 63 that is formed at a base portion of the upright portion 61.

When the upright portion 61 of the fastener portion 6 is inserted into the attachment hole 81 of the support 8, the projecting portions 62 pass through the attachment hole 81 while being temporarily deformed in an elastic manner in a direction in which the width thereof is reduced, and engage with an edge portion of the attachment hole 81 on one principal surface side (back surface side) of the support 8.

Furthermore, the flange portion 63 of the fastener portion 6 engages with the edge portion of the attachment hole 81 on the other principal surface side (front surface side) of the support 8. The fastener portion 6 is fastened to the support 8 by the projecting portions 62 and the flange portion 63 holding the edge portion of the attachment hole 81 of the support 8 from both sides. In this manner, the fixing members 4 are fixed to the support 8, and the metal exterior member 3 is fixed to the support 8 by the individual fixing members 4 at the plurality of locations.

In the electric cable 10 with protection member, the synthetic resin tube 2 that is continuous in the circumferential direction has the functions of waterproofing and protecting the electric cable 1. Meanwhile, the metal exterior member 3 ensures the shock resistance with respect to a portion of the electric cable 1 and maintains the shape of the electric cable 1.

It should, however, be noted that the metal exterior member 3, which has the bellows structure and is thus capable of bending deformation, does not have enough stiffness to maintain a fixed shape against a large external force. However, in a state in which the plurality of fixing members 4 attached to a plurality of locations on the metal exterior member 3 are fixed to the support 8 such as the body panel of the vehicle, the fixing members 4 serve to keep the metal exterior member 3 in a fixed shape against a large external force.

Furthermore, the synthetic resin tube 2 on the inner side is a flexible tube, and the metal exterior member 3 on the outer side is a member capable of bending deformation. Thus, the metal exterior member 3 can be relatively easily deformed in accordance with specification changes and dimensional tolerances of the wiring route, without using a large-scale forming apparatus. As a result, the metal exterior member 3 having a shape that meets the specifications of the wiring route can be provided at relatively low cost.

For the above-described reasons, the electric cable 10 with protection member makes it possible to waterproof the electric cable 1, ensure shock resistance with respect to a portion of the electric cable 1, and maintain the shape of the electric cable 1. Furthermore, the electric cable 10 with protection member is easily adaptable to specification changes and dimensional tolerances, and the electric cable 10 with protection member can be provided at low cost.

Moreover, even in the case where a member made of a relatively hard synthetic resin having excellent wear resistance is employed as the synthetic resin tube 2, it is easy to ensure the flexibility of the synthetic resin tube 2 due to the bellows structure. Similarly, even in the case where a metal member having excellent shock resistance is employed as the metal exterior member 3, it is easy to render the metal exterior member 3 capable of bending deformation due to the bellows structure.

Moreover, the metal exterior member 3 is a tubular member having the continuous slit 33 extending over the entire length of the metal exterior member 3. Thus, a portion of the synthetic resin tube 2 can be inserted into the hollow portion of the metal exterior member 3 through the slit 33 of the metal exterior member 3. That is to say, the step of passing the electric cable 1 and the synthetic resin tube 2 through the hollow portion of the metal exterior member 3 from one end thereof is not necessary. As a result, the step of making the metal exterior member 3 cover the circumference of a portion of the synthetic resin tube 2 is easy.

Moreover, the interposed member 7 prevents displacement of the metal exterior member 3 relative to the synthetic resin tube 2 and also prevents inward deformation of a portion of the metal exterior member 3 due to the pressure applied from the connection portions 5 of the fixing members 4.

Moreover, in the case where the metal exterior member 3 containing a magnetic material is employed, the metal exterior member 3 not only has the functions of protecting the electric cable 1 and maintaining the shape of the electric cable 1 but also functions as a magnetic shielding material. Such metal exterior member 3 is preferable in the case where magnetic shielding of the electric cable 1 is required.

First Application Example

Figure 6:
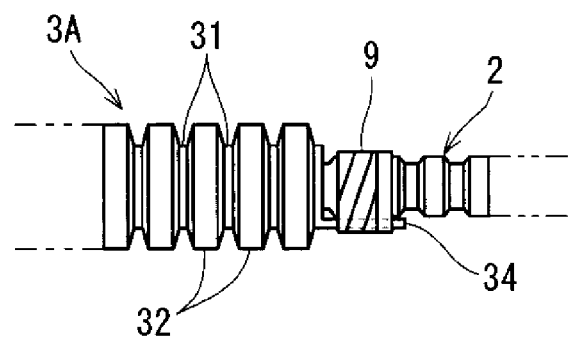
FIG. 6 is a side view of a metal exterior member and a synthetic resin tube connected to the metal exterior member, according to a first application example that can be applied to the electric cable 10 with protection member.

Next, a metal exterior member 3A according to a first application example that can be applied to the electric cable 10 with protection member will be described with reference to FIG. 6. FIG. 6 is a side view of the metal exterior member 3A and the synthetic resin tube 2 connected to the metal exterior member 3A.

The metal exterior member 3A according to the first application example has a configuration in which a tied portion 34 is added to the metal exterior member 3 described in the embodiment. In FIG. 6, constituent elements that are the same as the constituent elements shown in FIGS. 1 to 5 are denoted by the same reference numerals. Hereinafter, the differences of the metal exterior member 3A from the metal exterior member 3 will be described.

As shown in FIG. 6, the metal exterior member 3 has on at least one end thereof the tied portion 34 that is formed projecting along the synthetic resin tube 2. This tied portion 34 is tied to the synthetic resin tube 2 extending out of that end of the metal exterior member 3 with a tying material 9. The tying material 9 may be a tying belt or an adhesive tape, for example.

Tying the tied portion 34 to the synthetic resin tube 2 with the tying material 9 enables prevention of displacement of the metal exterior member 3 relative to the synthetic resin tube 2. Therefore, in the case where the metal exterior member 3A is employed in the electric cable 10 with protection member instead of the metal exterior member 3, a configuration is conceivable in which the inner protrusion 71 and the outer protrusions 72 of the interposed member 7 are omitted.

Second Application Example

Figure 7:
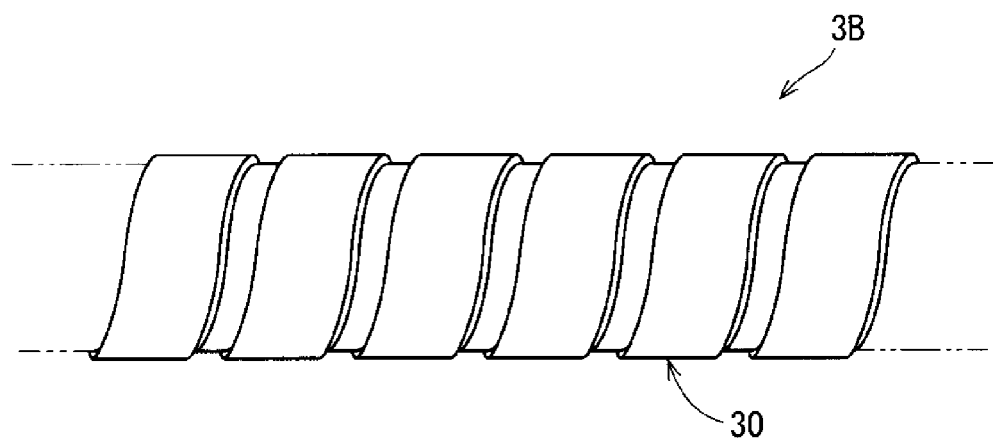
FIG. 7 is a side view of a metal exterior member according to a second application example that can be applied to the electric cable 10 with protection member.
Figure 8:
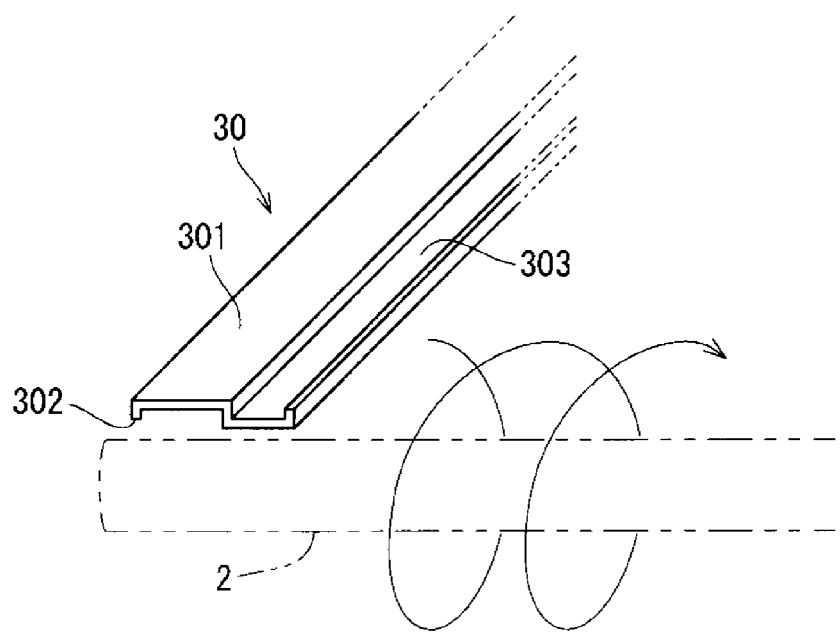
FIG. 8 is a perspective view of a metal plate member from which the metal exterior member according to the second application example is formed.

Next, a metal exterior member 3B according to a second application example that can be applied to the electric cable 10 with protection member will be described with reference to FIGS. 7 and 8. FIG. 7 is a side view of the metal exterior member 3B according to the second application example. FIG. 8 is a perspective view of a metal plate member 30 from which the metal exterior member 3B is formed.

Unlike the metal exterior member 3 described in the embodiment, the metal exterior member 3B does not have a bellows structure, but rather has a structure in which the metal plate member 30 is helically wound. In FIGS. 7 and 8, the constituent element that is the same as the constituent element shown in FIGS. 1 to 5 is denoted by the same reference numeral. Hereinafter, the differences of the metal exterior member 3B from the metal exterior member 3 will be described.

The metal plate member 30, from which the metal exterior member 3B is formed, is an elongated plate member made of a metal. As shown in FIG. 8, the metal plate member 30 has a band-like base portion 301 constituting a central portion of the metal plate member 30 as well as an upright portion 302 and a groove-like portion 303 that are respectively formed at first and second edge portions on opposite sides extending in a longitudinal direction of the metal plate member 30.

The upright portion 302 is formed protruding upright from the base portion 301 to one principal surface side thereof and extending in the longitudinal direction of the metal plate member 30. The groove-like portion 303 is a portion that forms a groove (recess) extending in the longitudinal direction of the metal plate member 30 on the other principal surface side of the base portion 301.

The metal exterior member 3B is a member formed in a tubular shape by helically winding the metal plate member 30, in which the upright portion 302 and the groove-like portion 303 are respectively formed at the first and second edge portions on opposite sides, around the synthetic resin tube 2. Furthermore, the metal exterior member 3B is formed in the tubular shape in a state in which the upright portion 302 of the metal plate member 30 is inserted in the groove-like portion 303.

Even in the case where the metal exterior member 3B is employed in the electric cable 10 with protection member instead of the metal exterior member 3, the step of making the metal exterior member 3B cover the circumference of a portion of the synthetic resin tube 2 is easy as in the case where the metal exterior member 3, in which the slit 33 is formed, is employed.

Moreover, the upright portion 302 at the first side edge portion of the elongated metal plate member 30 and the groove-like portion 303 at the second side edge portion engage with each other. Thus, formation of a gap in the metal exterior member 3B due to displacement of the helically wound metal plate member 30 is prevented.

Other Application Examples

The metal materials listed above as candidates for the material of the metal exterior member 3 in the embodiment are also candidates for the material of the metal exterior members 3A and 3B. Moreover, a configuration is also conceivable in which the interposed member 7 is omitted from the electric cable 10 with protection member.

Moreover, a configuration is also conceivable in which some or all of the plurality of fixing members 4 in the foregoing embodiment are replaced by fixing portions that are formed as part of the metal exterior member 3. For example, it is conceivable that fixing portions in each of which a hole through which a screw for fixation to the support is formed are formed in part of the metal exterior member 3.

Moreover, a configuration is also conceivable in which the synthetic resin tube 2 is a tube that is made of a relatively flexible synthetic resin material and that does not have the bellows structure. For example, it is also conceivable that the synthetic resin tube 2 is a tube made of a rubber synthetic resin such as elastomer or other relatively flexible synthetic resin materials. Moreover, it is also conceivable that the synthetic resin tube 2 is a rubber tube other than a tube made of a rubber synthetic resin.

It should be noted that the electric cable with protection member according to the present invention can also be configured not only by freely combining the embodiment and application examples that have been described above but also by modifying the embodiment and application examples, or omitting a portion thereof, as appropriate without departing from the scope of the invention as defined in the claims.

LIST OF REFERENCE NUMERALS

10: Electric cable with protection member
1: Electric cable
2: Synthetic resin tube
21: Small-diameter portion of synthetic resin tube
22: Large-diameter portion of synthetic resin tube
3, 3A, 3B: Metal exterior member
30: Metal plate member
31: Small-diameter portion
32: Large-diameter portion
33: Slit
34: Tied portion
301: Base portion
302: Upright portion
303: Groove-like portion
4: Fixing member
5: Connection portion
51: First side portion
52: Second side portion
53: Hinge portion
54: Exterior member insertion hole
55: Lock portion
56: Inner protrusion
6: Fastener portion
61: Upright portion
62: Projecting portion
63: Flange portion
7: Interposed member
70: Elemental member
701: Temporary fastening protrusion
702: Temporary fastening recess 71: Inner protrusion
72: Outer protrusion
8: Support
80: Object to be avoided
81: Attachment hole
9: Tying material

The invention claimed is:

1. An electric cable with protection member comprising:
an electric cable;
a tube surrounding a circumference of at least a portion of a region of the electric cable in a longitudinal direction, the tube being formed in a tubular shape that is continuous in a circumferential direction and having flexibility;
a metal exterior member surrounding the circumference of a portion of a region of the tube in the longitudinal direction, the metal exterior member being formed in a tubular shape that is capable of bending deformation, and being able to maintain a fixed shape against a load of the electric cable and the tube; and
a plurality of fixing portions that are provided on the metal exterior member and that can be fixed to a support,
wherein the metal exterior member has, on at least one end of the metal exterior member, a tied portion that is formed projecting along the tube from a portion of an outer circumference of the metal exterior member,
each of the tube and the metal exterior member is a member formed in a tubular shape having a bellows structure in which a series of alternate small-diameter and large-diameter portions are formed, the small-diameter portions having an outline size in the circumferential direction that is different from that of the large-diameter portions,
the electric cable with protection member further includes an annular interposed member which is interposed between the tube and the metal exterior member and has an inner protrusion that is to be fitted between adjacent ones of the large-diameter portions of the tube and is formed on an inner surface side of the interposed member, and an outer protrusion that is to be fitted between adjacent ones of the small-diameter portions of the metal exterior member and is formed on an outer surface side of the interposed member, and
the fixing portions are attached to a portion of the metal exterior member that encloses the interposed member.

2. The electric cable with protection member according to claim 1
wherein the metal exterior member is a member formed in a tubular shape having a continuous slit extending over an entire length of the metal exterior member.

3. The electric cable with protection member according to claim 2,
wherein the metal exterior member is a member containing a magnetic material.

4. The electric cable with protection member according to claim 1,
wherein the metal exterior member is a member containing a magnetic material.

5. An electric cable with protection member comprising:
an electric cable;
a tube surrounding a circumference of at least a portion of a region of the electric cable in a longitudinal direction, the tube being formed in a tubular shape that is continuous in a circumferential direction, and having flexibility;
a metal exterior member surrounding the circumference of a portion of a region of the tube in the longitudinal direction, the metal exterior member being formed in a tubular shape that is capable of bending deformation, and being able to maintain a fixed shape against a load of the electric cable and the tube;
a plurality of fixing portions that are provided on the metal exterior member and that can be fixed to a support; and
an interposed member interposed between the tube and the metal exterior member,
wherein each of the tube and the metal exterior member is a member formed in a tubular shape having a bellows structure in which a series of alternate small-diameter and large-diameter portions are formed, the small-diameter portions having an outline size in the circumferential direction that is different from that of the large-diameter portions, and
the interposed member is formed in an annular shape in which an inner protrusion to be fitted between adjacent ones of the large-diameter portions of the tube is formed on an inner surface side of the interposed member, and an outer protrusion to be fitted between adjacent ones of the small-diameter portions of the metal exterior member is formed on an outer surface side of the interposed member.

* * * * *